(12) United States Patent
Sheets (10) Patent No.: US 7,489,819 B2
(45) Date of Patent: Feb. 10, 2009

(54) SYSTEMS AND METHODS FOR HANDWRITTEN DIGITAL PEN LEXICAL INFERENCE

(75) Inventor: Rodney L. Sheets, Salt Lake City, UT (US)

(73) Assignee: Velosum, Inc., Sandy, UT (US)

( * ) Notice: Subject to any disclaimer, the term of this patent is extended or adjusted under 35 U.S.C. 154(b) by 0 days.

(21) Appl. No.: 11/747,418

(22) Filed: May 11, 2007

(65) Prior Publication Data

US 2007/0263931 A1 Nov. 15, 2007

Related U.S. Application Data

(60) Provisional application No. 60/799,671, filed on May 12, 2006.

(51) Int. Cl.
*G06K 9/00* (2006.01)

(52) U.S. Cl. .................................................... 382/186

(58) Field of Classification Search ........................ None
See application file for complete search history.

(56) References Cited

U.S. PATENT DOCUMENTS

| | | | | |
|---|---|---|---|---|
| 4,610,025 | A * | 9/1986 | Blum et al. | 382/177 |
| 5,754,671 | A * | 5/1998 | Higgins et al. | 382/101 |
| 6,595,918 | B2 | 7/2003 | Gopinathan et al. | |
| 6,698,660 | B2 | 3/2004 | Fåhraeus et al. | |
| 6,878,062 | B2 | 4/2005 | Björklund et al. | |
| 6,915,281 | B2 | 7/2005 | Coffy et al. | |
| 6,985,747 | B2 | 1/2006 | Chithambaram | |
| 7,089,308 | B2 | 8/2006 | Fransson et al. | |
| 7,094,977 | B2 | 8/2006 | Ericson et al. | |
| 7,110,576 | B2 | 9/2006 | Norris, Jr. et al. | |
| 2003/0125981 | A1 | 7/2003 | Pedrazzoli Pazos | |
| 2003/0165048 | A1 | 9/2003 | Bamji et al. | |
| 2003/0220835 | A1 | 11/2003 | Barnes, Jr. | |
| 2004/0046742 | A1 | 3/2004 | Johnson | |

(Continued)

FOREIGN PATENT DOCUMENTS

EP     0 987 047 A2     3/1999

(Continued)

OTHER PUBLICATIONS

Accenture, "Points of View: Digital Pen and Paper," Oct. 2003, printed Oct. 26, 2006, pp. 1-4, http://www.accenture.com/Global/Services/Accenture_Technology_Labs/R_and_I/PointsPaper.htm.

(Continued)

*Primary Examiner*—Matthew C. Bella
*Assistant Examiner*—Alex Liew
(74) *Attorney, Agent, or Firm*—Kory D. Christensen; Stoel Rives LLP (57) ABSTRACT

Systems and methods are provided for recognizing handwritten characters drawn on a paper form using a digital pen that records stroke coordinates corresponding to respective pen strokes. In one embodiment, a field on the paper form is assigned a lexical inference level. For example, the field may be assigned a word level, a word prefix level, and/or a word stem level. The assigned lexical inference level is used to recognize one or more stroke coordinates corresponding to pen strokes written in the field. Recognized characters are then used to create or modify an inference lexicon used to perform handwriting recognition for the entire field. In one embodiment, the inference lexicon is used for handwriting recognition in the same field on subsequently processed forms.

20 Claims, 5 Drawing Sheets

U.S. PATENT DOCUMENTS

| | | | |
|---|---|---|---|
| 2004/0161151 A1* | 8/2004 | Iwayama et al. | 382/187 |
| 2006/0125805 A1 | 6/2006 | Marggraff | |
| 2006/0159345 A1 | 7/2006 | Clary et al. | |
| 2006/0183505 A1 | 8/2006 | Willrich | |
| 2006/0221383 A1 | 10/2006 | Katsurabayashi | |
| 2006/0235611 A1 | 10/2006 | Deaton et al. | |
| 2006/0235741 A1 | 10/2006 | Deaton et al. | |
| 2006/0267965 A1 | 11/2006 | Clary | |

OTHER PUBLICATIONS

Logitech IO Digital Writing System, "Digital Pens Bring Police Online," 2004, 3 pgs., www.logitechio.com/iobusiness.

Wiltshire Police News Article, "Wiltshire Police is world's first force to put 'digital pen to paper'", Jun. 16, 2004, printed Oct. 25, 2006, pp. 1-4, http://www.wiltshire.police.uk/news/newsview.asp?id=454.

"HP Announces Secure, Mobile Law Enforcement Solutions at California Police Chiefs Association Conference," Feb. 8, 2005, printed Oct. 25, 2006, pp. 1-3, http://www.hp.com/hpinfo/newsroom/press/2005/050208a.html, Sacramento, California.

Anoto Business Case, "Police save crucial time with digital pen and paper solution," printed Oct. 25, 2006, 3 pgs., http://partner.anoto.com/cldoc/15829.htm.

Case Study: Dotforms Notes, "dotforms notes: e-letter for the better!" by Diagramm Halbach GmbH & Co. KG, Schwerte, Germany, Feb. 2007, 2 pgs., www.halbach.com/dotforms.

Lozano, Narcis, et al., "Abstracting Pen Interfaces into Paper Interface Architecture," 2005, pp. 37-41, Department of Computer, Information and Communication Sciences, Tokyo University of Agriculture and Technology, Fujisawa Human Interface.

"French Ambulance Data Goes Mobile," Jan. 2004, printed Oct. 22, 2007, 3 pgs., http://www.healthdatamanagement.com/HDMSearchResultsDetails.cfm?articleId=11733.

"In-Ambulance Remote Image Acquisition System Based on New Data-Compression Technology," Translation of the AIST press released on Oct. 21, 2004, printed Oct. 22, 2007, 7 pgs., National Institute of Advanced Industrial Science and Technology (AIST), http://www.aist.go.jp/aist_e/latest_research/2004/20041214/20041214.html.

Abstract, Gallego Jr., Hernandez-Solana A. et al., "Performance analysis of multiplexed medical data transmission for mobile emergency care over the UMTS channel," Mar. 2005, printed Oct. 22, 2007, 1 pg., IEEE Trans Inf Technol Biomed 9(1):13-22, Communications Technology Group, Aragon Institute for Engineering Research, Zaragoza 50018, Spain, http://www.ncbi.nlm.nih.gov/sites/entrez?cmd=Retrieve&db=PubMed&list_uids=15787003&dopt=AbstractPlus.

Sneiderman, MD, PhD, Charles A. et al., "Cellular Radio Telecommunication for Healh Care: Benefits and Risks," Nov.-Dec. 2004, printed Oct. 22, 2007, 10 pgs., The Journal of the American Medical Informatics Association, 11(6):479-487, doi: 10.1197/jamia.M1532, http://www.pubmedcentral.nih.gov/articlerender.fcgi?artid=524627.

* cited by examiner

PARKING NOTICE VIOLATION
TO THE DRIVER AND REGISTERED OWNER    PE

LICENSE PLATE
⓪ ① ② ③ ④ ⑤ ⑥ ⑦ ⑧ ⑨
(NP) [______________] (CLR)
Ⓐ Ⓑ Ⓒ Ⓓ Ⓔ Ⓕ Ⓖ Ⓗ Ⓘ
Ⓙ Ⓚ Ⓛ Ⓜ Ⓝ Ⓞ Ⓟ Ⓠ
Ⓡ Ⓢ Ⓣ Ⓤ Ⓥ Ⓦ Ⓧ Ⓨ Ⓩ

VEHICLE STATE
○-UT ○-CA ○-CO ○-ID
○-NV ○-TX ○-WY    [____] — 810

VEHICLE MAKE
○-FORD ○-CHEV
○-HOND ○-GM
○-JEEP ○-TOYT    [____] — 812

OFFICER [____] — 814    AREA [____]

DATE [____________]    TIME [____________]

ADDRESS
LOCATION [__________]   DIR. [____]   SUFFIX [____]
STREET [__________________________________]

816, 818

VIOLATION(S)
○ EXPIRED METER    METER [____________]
   Ord. 12.56.150 - $10.00
○ EXPIRED REGISTRATION   EXP. DATE [____] ○ VC
   Ord. 12.56.040 - $20.00
○ PARKING TIME LIMIT     ○ PERMIT PARKING
   Ord. 12.56.450 - $10.00     Ord. 12.56.310b - $20.00
○ NO PARKING     ○ FIRE HYDRANT
   Ord. 12.56.460 - $20.00     Ord. 12.56.4405 - $25.00
○ FREIGHT ZONE     ○ ANGLE PARKING
   Ord. 12.56.330 - $20.00     Ord. 12.56.110 - $17.00
○ AIRPORT PARKING     ○ PASSENGER ZONE
   Ord. 12.56.250 - $17.00     Ord. 12.56.380 - $20.00

12. [__] 6. [__________]    [__________________]

REMARKS
[__________________________]    (SEND) — 822
○ VIN [__________________]

800, 820

SYSTEMS AND METHODS FOR HANDWRITTEN DIGITAL PEN LEXICAL INFERENCE

RELATED APPLICATION

This application claims the benefit under 35 U.S.C. § 119 (e) of U.S. Provisional Application No. 60/799,671, filed May 12, 2006, which is hereby incorporated by reference herein in its entirety.

TECHNICAL FIELD

This disclosure relates to electronically filling out a paper form using a digital pen. More specifically, this disclosure relates to recognizing characters written with a digital pen on a paper form using dynamically created lexical inferences associated with particular form fields.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION OF PREFERRED EMBODIMENTS

A user may write on a paper form using a digital pen that both marks the form and electronically records the marks in relation to various form fields. Thus, user selections made using the paper form and the digital pen may be automatically determined and an electronic image of the paper form may be generated that includes the user's marks. Digital pens usable with the disclosure herein include, for example, a digital pen available from Anoto AB of Stockholm, Sweden (also referred to herein as an "Anoto-type" pen), a digital pen available from Hitachi Maxell Ltd. of Tokyo, Japan, or a digital pen available from Logitech Inc. of Freemont, Calif., USA.

In one embodiment, a user may write characters such as numbers, letters or words in a particular field on a form. The data collected by the digital pen is analyzed to recognize the characters such that the characters may be automatically entered into a searchable database. Given the wide range of handwriting differences between individuals, however, conventional character-level recognition systems generally do not provide sufficient accuracy for many applications. Thus, according to certain embodiments disclosed herein, character recognition accuracy is increased by providing context to the particular field where the characters are written.

In one embodiment, different lexical inference types may be customized for each form field on a paper form. For example, a user may define a form field including lexical inference recognition based on a word level wherein one or more pen strokes within the form field are compared to a predefined set of words related to the form field.

In one embodiment, the user defining the field may selectively customize the predefined set of words. In addition, or in another embodiment, a system component may track end-user entries in the particular form field and predict additional words to add to the predefined set of words based, for example, on end-user word frequency. Thus, the system component may generate or add to a customized lexicon to recognize future handwritten entries in the same form field on subsequently processed forms.

In one embodiment, the user may also define a form field including lexical inference recognition based on a word prefix level wherein one or more pen strokes within the form field are compared to a predefined set of word prefixes related to the form field. Stroke segments that include a predefined word prefix initiate a modification of valid lexical entries used to perform handwriting recognition. By way of illustration, in the case of a word prefix defined as "re" in the example (re)treatment, pen strokes predefined for the "re" prefix are reconciled and a further refinement of the field specific lexicon can be made using that word prefix signature.

In one embodiment, the user may also define a form field including lexical inference recognition based on a word stem level wherein one or more pen strokes within the form field are compared to a predefined set of word stems related to the form field. Stroke segments that include a predefined word stem initiate a modification of valid lexical entries used to perform handwriting recognition. By way of illustration, in the case of a word stem such as "treat" in the example re(treat)ment, pen strokes predefined for that word stem are reconciled and a further refinement of the field specific lexicon can be made using that word stem signature.

The embodiments of the disclosure will be best understood by reference to the drawings, wherein like elements are designated by like numerals throughout. In the following description, numerous specific details are provided for a thorough understanding of the embodiments described herein. However, those of skill in the art will recognize that one or more of the specific details may be omitted, or other methods, components, or materials may be used. In some cases, operations are not shown or described in detail.

Furthermore, the described features, operations, or characteristics may be combined in any suitable manner in one or more embodiments. It will also be readily understood that the order of the steps or actions of the methods described in connection with the embodiments disclosed may be changed as would be apparent to those skilled in the art. Thus, any order in the drawings or Detailed Description is for illustrative purposes only and is not meant to imply a required order, unless specified to require an order.

Embodiments may include various steps, which may be embodied in machine-executable instructions to be executed by a general-purpose or special-purpose computer (or other electronic device). Alternatively, the steps may be performed by hardware components that include specific logic for performing the steps or by a combination of hardware, software, and/or firmware.

Embodiments may also be provided as a computer program product including a machine-readable medium having stored thereon instructions that may be used to program a computer (or other electronic device) to perform processes described herein. The machine-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of media/machine-readable medium suitable for storing electronic instructions.

Figure 1:
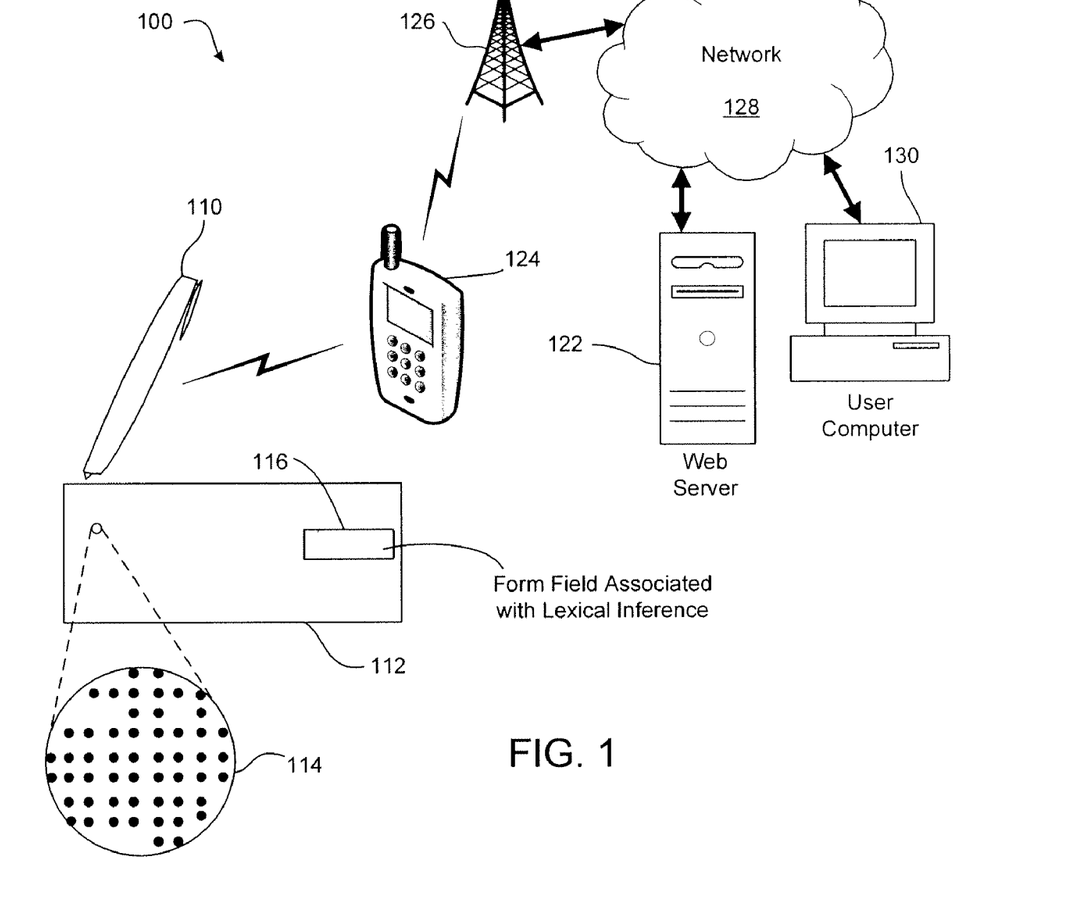
FIG. 1 is a block diagram of an example system for processing data received from a digital pen according to one embodiment.

FIG. 1 is a block diagram of an example system 100 for processing data received from a digital pen 110 according to one embodiment. The digital pen 110 is configured to write on a paper form 112 and to electronically capture pen strokes in relation to a position-coding pattern 114 on a writing surface of the form 112. As discussed above, the digital pen 110 may include an Anoto-type pen. Thus, although not shown, the digital pen 110 may include a ball point tip, an ink cartridge, a camera with a lens that is directed toward the ball point tip, a pressure sensitive sensor that activates when pressure is applied to the ball point tip, a processor, a memory device, a communication device, and a power source. However, an artisan will recognize from the disclosure herein that other types of digital pens known in the art may also be used.

In one embodiment, a user may use the pen to make pen strokes (e.g., in ink) on the form 110. The digital pen 110 determines the location of the pen strokes on the form 112 relative to the position-coding pattern 114 by analyzing the position-coding pattern 114 as pressure is applied to the ball point tip. Thus, each pen stroke is associated with a series of coordinates (x(t), y(t)) in, for example, a Cartesian coordinate system defined by the position-coding pattern 114. Here, x(t) corresponds to a unique location in the position-coding pattern 114 along an x-axis at a particular time during the stroke. Similarly, y(t) corresponds to a unique location in the position-coding pattern 114 along a y-axis at a particular time during the stroke.

In one embodiment, the form 112 includes one or more predetermined form fields 116 that a user may mark using the digital pen 110 to make a particular selection. The field 116 may be preprinted on the form 112 at a predetermined location with respect to the position-coding pattern 114. Thus, the position of a pen stroke relative to the position-coding pattern 114 may be used to determine if the user has marked a location within an area defined by the field 116.

Data for each stroke collected by the digital pen 110 may be stored in a stroke collection file that is communicated to a web server 122 through, for example, a user's cellular phone 124, a wireless communication system 126, and a network 128 such as the Internet or a local area network (LAN). In one embodiment, the digital pen transmits data to the cellular phone 124 using Bluetooth®. In addition, or in another embodiment, the data may be retrieved from the digital pen 110 through a cable or docking station. In one embodiment, a user computer 130 communicates with the web server 122 through the network 128. The user computer 130 may be configured, for example, to allow a user to define the form field 116 including assigning a lexical inference type thereto, as discussed in detail below.

Figure 2:
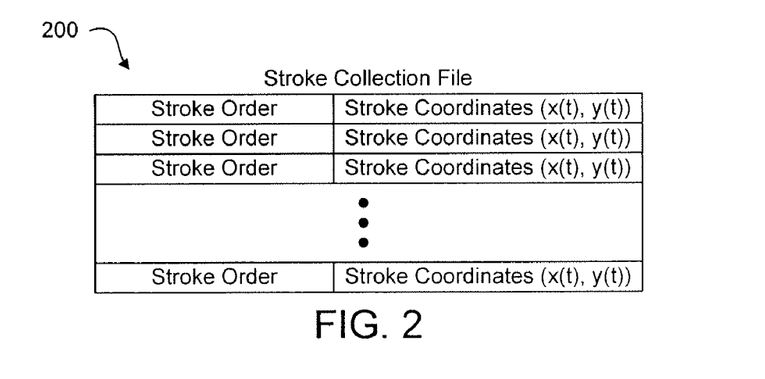
FIG. 2 is a block diagram of a data structure for a stroke collection file according to one embodiment.

FIG. 2 is a block diagram of a data structure for an example stroke collection file 200 according to one embodiment. As a user makes a pen stroke on the form 112 using the digital pen 110, the digital pen 110 assigns a stroke order (e.g., first, second, third, etc.) to the stroke relative to previous pen strokes, if any, made on the particular form 112. After determining the coordinates (x(t), y(t)) of the stroke in relation to the position-coding pattern 114, the digital pen 110 adds the stroke's stroke order and stroke coordinates to the stroke collection file 200. When the user indicates that the form is complete (e.g., by marking a predetermined location on the form 112), the digital pen 110 transmits the stroke collection file 200 to the cellular phone 124 for further processing and transmission to the web server 122.

Figure 3:
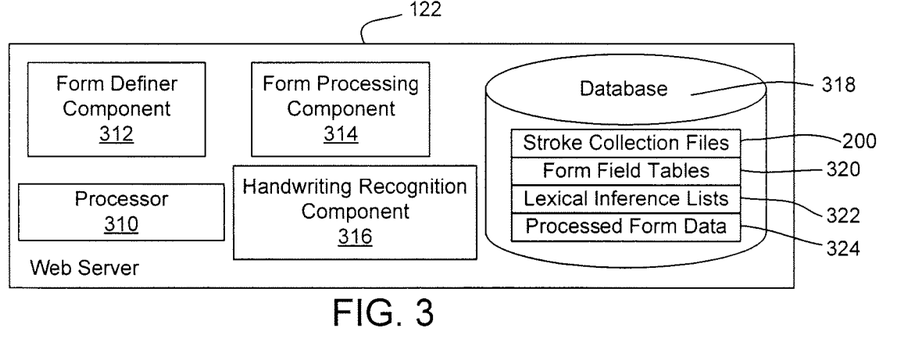
FIG. 3 is a block diagram according to one embodiment of a web server usable by the system shown in FIG. 1 for defining a form field, processing data received from a digital pen, and recognizing handwriting in the form field written using the digital pen.

FIG. 3 is a block diagram of a web server 122 usable by the system 100 shown in FIG. 1 for defining the form field 116, processing data received from the digital pen 110, recognizing handwriting on the form 112 written using the digital pen 110, and other processes described herein. The web server 122 includes a processor 310 for performing software instructions on the data received from the digital pen 110, as described herein. In addition, or in another embodiment, the cellular phone 124 may also perform part or all of the processing on the data received from the digital pen 110.

In one embodiment, the web server 122 also includes a form definer component 312, a form processing component 314, a handwriting recognition component 316, and a database 318. The database 318 may include, for example, the stroke collection files 200. As discussed below, the database 318 may also include form field tables 320, lexical inference lists 322, and processed form data 324.

The form definer component 312 is configured to allow a user to define the form field 116 through, for example, the user computer 130. In one embodiment, the form definer component 312 generates a form field table that includes user selections for each field defined by the user.

Figure 4:
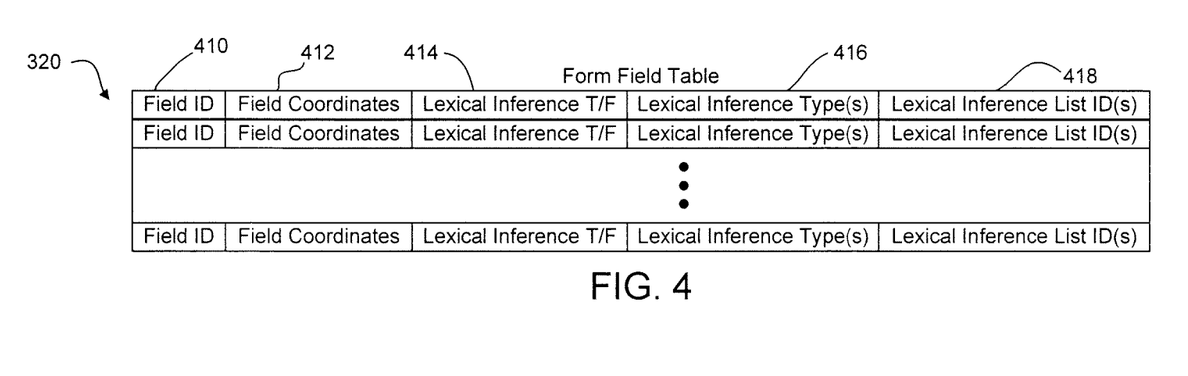
FIG. 4 is a block diagram of a data structure for an example form field table according to one embodiment.

For example, FIG. 4 is a block diagram of a data structure for an example form field table 320 according to one embodiment. When the user creates a new field (e.g., form field 116), the form definer component 312 creates a new entry in the form field table 320 with a unique field identifier (ID) 410. Although not shown, the field ID 410 may include a field name and a description of the type of information intended to be entered into the corresponding field 116. The form definer component 312 may allow the user to define the location and layout of the form field 116 with respect to the position-coding pattern 114. The form definer component 312 adds the field's location and layout information to a field coordinates entry 412 in the form field table 320.

In one embodiment, the form definer component 312 also allows the user to specify whether the form field 116 includes character recognition capabilities associated with a selected lexical inference type. For example, the user may set a lexical inference flag 414 in the form field table 320 to "T" (true) if the form field 116 includes character recognition associated with a lexical inference type, or to "F" (false) if the form field 116 does not include character recognition associated with a lexical inference type.

Figure 5:
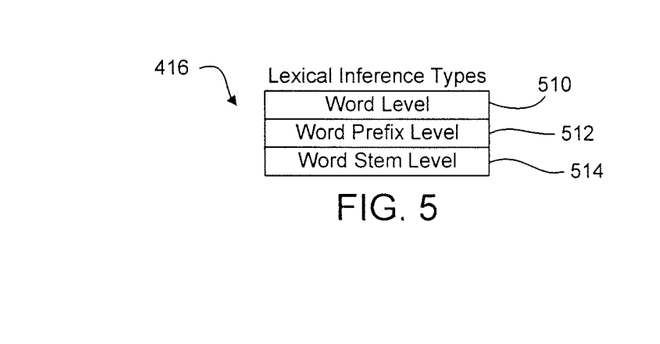
FIG. 5 is a block diagram of a data structure for example inference types that may be selected by a user defining a form field according to one embodiment.

If the lexical inference flag 414 is set to true, the form definer component 312 allows the user to select one or more lexical inference types 416 for the form field 116. FIG. 5, for example, is a block diagram of a data structure for example inference types 416 that may be selected by the user defining the form field 116. The example inference types 416 include a word level 510, a word prefix level 512, and a word stem level 514. An artisan will recognize from the disclosure herein, however, that other lexical inference levels may also be used. For example, a word suffix list, punctuation model, grammar model, and combinations of the foregoing may also be used.

Depending on the lexical inference type(s) 416 selected by the user, the form definer component 312 allows the user to select and/or define one or more lexical inference lists 322 (see FIG. 3). For each lexical inference list 322 selected and/or defined by the user, the form definer component 312 adds a lexical inference list ID 418 to the form field table 320 that points to the corresponding lexical inference list 322 in the database 318.

As discussed above, if the user selects the word level 510, then the form definer component 312 allows the user to select and/or define a word list used to compare with pen strokes in the form field 116. In one embodiment, the word list is associated with the context of the form field 116 such that it includes one or more words expected or predicted to be written in the form field 116. For example, if the form field 116 corresponds to a user's eye color, the word list may include words such as "brown," "blue," "green," "hazel," etc.

If the user selects the word prefix level 512, then the form definer component 312 allows the user to select and/or define a prefix list related to the form field 116. In one embodiment, the prefix list also includes one or more predicted characters that follow a particular prefix in the list. For example, for a prefix "th," the intended next letter in the English language is likely to be "e" because "the" is far more probable than other combinations such as "thf" or "thw." Other examples include combined structures such as (re)treatment as provided as an example above.

If the user selects the word stem level 514, then the form definer component 312 allows the user to select and/or define a stem list related to the form field 116. In one embodiment, the stem list also includes one or more predicted characters that precede and/or follow a particular word stem in the list (see above).

The form processing component 314 is configured to receive and process one or more stroke collection files 200 from the digital pen 110 (e.g., through the cellular phone 124, wireless communication system 126, and network 128). The form processing component 314 may, for example, enter field selections or other processed form data 324 in the database 318 and/or render an electronic image of the form 112 with corresponding pen strokes written by an end user. The form processing component 314 is configured to determine one or more strokes that the end user wrote in the form field 116. If the form field 116 includes character recognition associated with a lexical inference type (e.g., as specified by the lexical inference flag 414), then the form processing component 314 passes the one or more strokes corresponding to the form field 116 to the handwriting recognition component 316.

The handwriting recognition component 316 is configured to recognize the strokes written in the form field 116 based on the selected lexical inference types 416 and corresponding lexical inference lists 322 (e.g., word lists, prefix lists, and/or stem lists). If the word level 510 is selected for the form field 116, the handwriting recognition component 316 according to one embodiment also tracks end-user entries in the form field 116 and predicts additional words to add to the pre-defined set of words based, for example, on end-user word frequency. Thus, the handwriting recognition component 316 may add frequently recognized words to the word list, if not already included therein.

Figure 6:
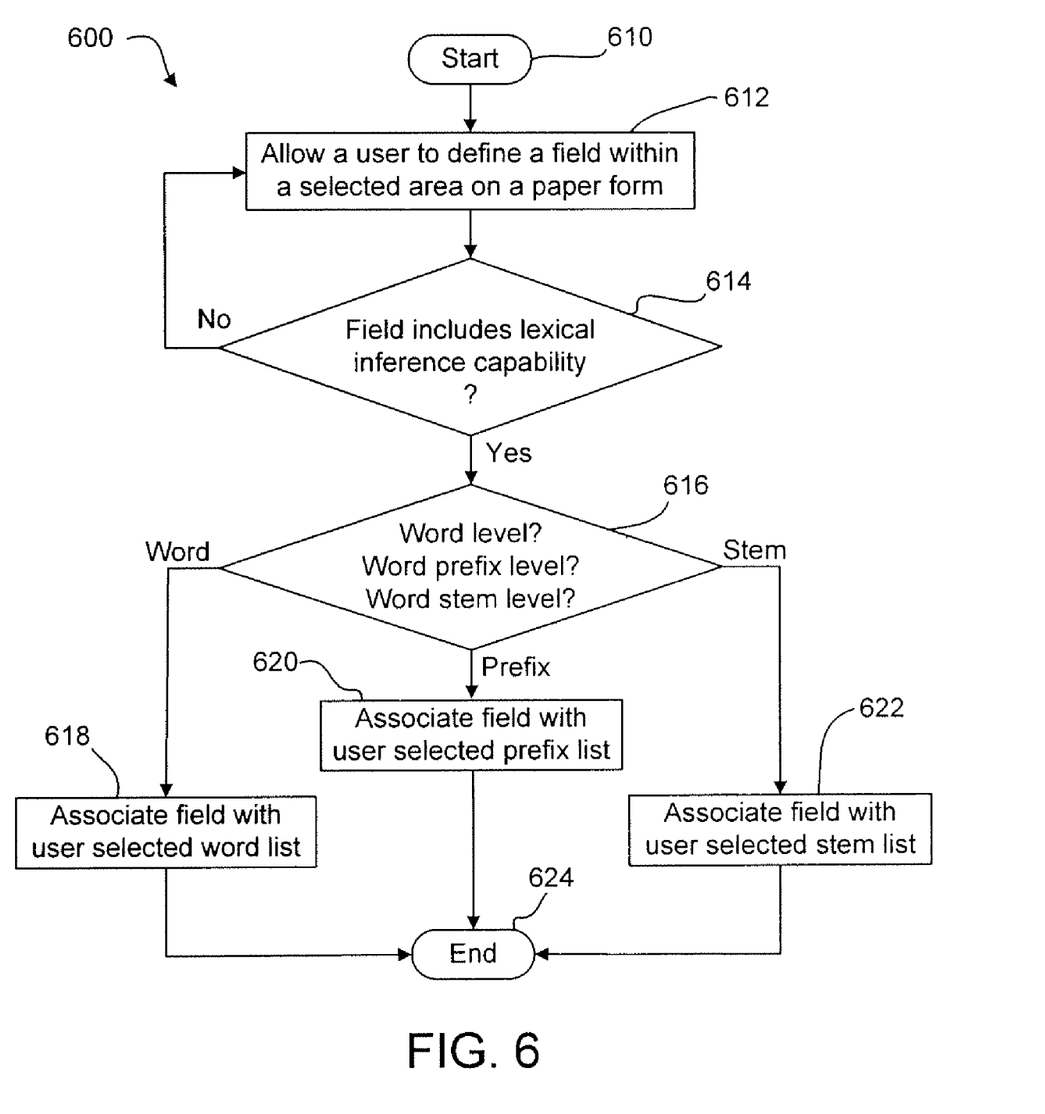
FIG. 6 is a flowchart of a process for defining a field on a paper form for contextualized lexical inference according to one embodiment.

FIG. 6 is a flowchart of a process 600 for defining a field on a paper form for contextualized lexical inference. After starting 610, the process 600 allows 612 a user to define a field within a selected area on the paper form. The process 600 then determines 614 whether the user defined the field to include lexical inference capability. If the field does include lexical inference capability, the process 600 determines 616 the user assigned lexical inference type corresponding to the field. In this example, the lexical inference types selectable by the user include word level, word prefix level, and word stem level.

If the user has selected the word level, the process 600 associates 618 the field with a user selected word list. If the user has selected the word prefix level, the process 600 associates 620 the field with a user selected prefix list. If the user has selected the word stem level, the process 600 associates 622 the field with a user selected stem list. The process 600 then ends 624.

Figure 7:
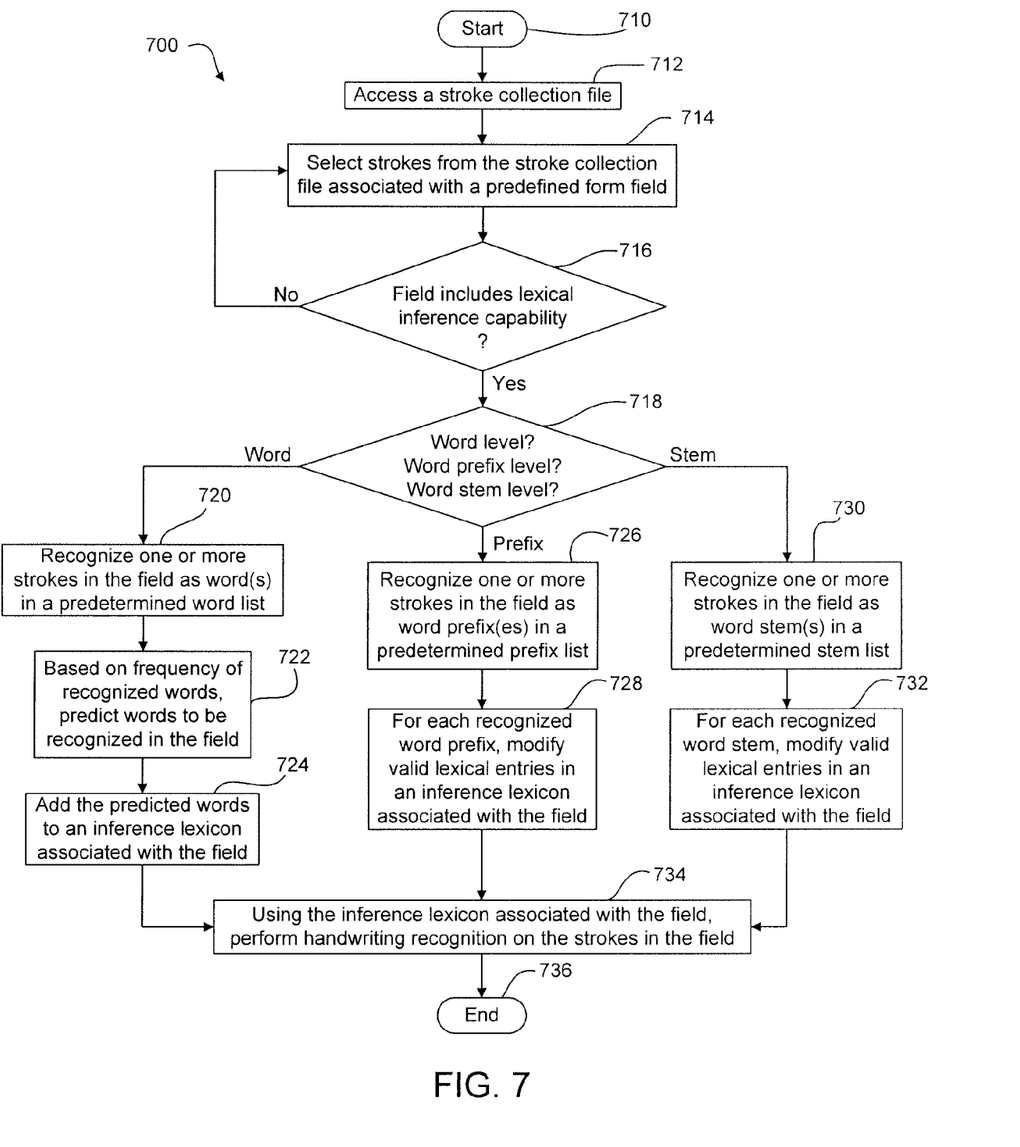
FIG. 7 is a flowchart of a process for recognizing digital pen strokes written on a paper form using dynamic lexical inference according to one embodiment.

FIG. 7 is a flowchart of a process 700 for recognizing digital pen strokes written on a paper form using dynamic lexical inference according to one embodiment. After starting 710, the process 700 accesses 712 a stroke collection file that includes data collected by a digital pen. As discussed above, the data in the stroke collection file may include a stroke order and stroke coordinates (x(t), y(t)) for each stroke in the stroke collection file. Using the stroke coordinates (x(t), y(t)), the process 700 selects 714 strokes from the stroke collection file associated with a predefined form field.

The process 700 then queries 716 whether the selected field includes lexical reference capability. If so, the process 700 queries 718 for an assigned lexical interference type for the field. Again, in this example, the lexical reference types include word level, word prefix level, and word stem level. Although not shown in FIG. 7, in one embodiment, more than one lexical inference type may be assigned to the field. For example, the field may be assigned word level and word prefix level lexical inference types.

If the word level lexical inference type has been assigned to the field, the process 700 recognizes 720 one or more strokes in the field as one or more words in a predetermined word list. Based on the frequency of the recognized words in the field, the process 700 also predicts 722 additional words to be recognized in the field. The process 700 then adds 724 the predicted words to an lexicon associated with the field.

The word frequency may be based on the current stroke collection file being processed. In addition, or in other embodiments, the word frequency may be based on previously processed stroke collection files that include the same field. Thus, the predicted words in the inference lexicon may be based on how frequently a word is used in the field in a plurality of stroke collection files.

If the word prefix level lexical inference type has been assigned to the field, the process 700 recognizes 726 one or more strokes in the field as one or more word prefixes in a predetermined prefix list. As discussed above, the prefix may be associated with one or more characters predicted to follow the prefix. For each recognized word prefix, the process 700 modifies 728 valid lexical entries in an inference lexicon associated with the field. The inference lexicon is dynamically modified based on the word prefix analysis for complete field level recognition. As discussed above, the inference lexicon may be based on the current stroke collection file and/or a plurality of previously processed stroke collection files. The modification of the valid lexical entries may be based on frequently used word prefixes included in the predetermined prefix list, frequently used word prefixes that are not included in the predetermined prefix list, and/or frequently used characters following the recognized prefixes.

If the word stem level lexical inference type has been assigned to the field, the process 700 recognizes 730 one or more strokes in the field as one or more word stems in a predetermined stem list. As discussed above, the stem may be associated with one or more characters predicted to precede and/or follow the stem. For each recognized word stem, the process 700 modifies 732 valid lexical entries in an inference lexicon associated with the field. As discussed above, the inference lexicon may be based on the current stroke collection file and/or a plurality of previously processed stroke collection files. The modification of the valid lexical entries may be based on frequently used word stems included in the predetermined stem list, frequently used word stems that are not included in the predetermined stem list, and/or frequently used characters preceding and/or following the recognized stems.

Regardless of the lexical inference type (or combination of inference types) used to generate the inference lexicon, the process 700 uses 734 the inference lexicon associated with the field to perform handwriting recognition on the strokes in the field. The process 700 then ends 738. Although the process 700 shown in FIG. 7 includes an inference lexicon for each lexical inference type (e.g., word, word prefix, and word stem), an artisan will recognize from the disclosure herein that two or more of the inference lexicons may be combined and/or that a single inference lexicon may be used for a particular form field for all lexical inference types. For example, in one embodiment, a field may be associated with two or more lexical inference types used to dynamically generate a single inference lexicon for the field. The inference lexicon may include frequently used words, word prefixes and word stems used in the particular field.

Thus, the process 700 uses a two pass lexical inference algorithm that provides three levels of inference and recognizes handwriting in a form field using modified lexicon entries. The first pass may be based on a specified lexical inference type using a lexical inference list (word list, prefix list, and/or stem list) to generate or modify an inference lexicon associated with the field. According to one embodiment, a lexical inference algorithm using the dynamically generated inference lexicon does not produce nonsensical handwriting recognition results. In such an embodiment, handwriting recognition results may only be based on the specified lexical inference type and/or valid entries within the dynamically generated inference lexicon.

Figure 8:
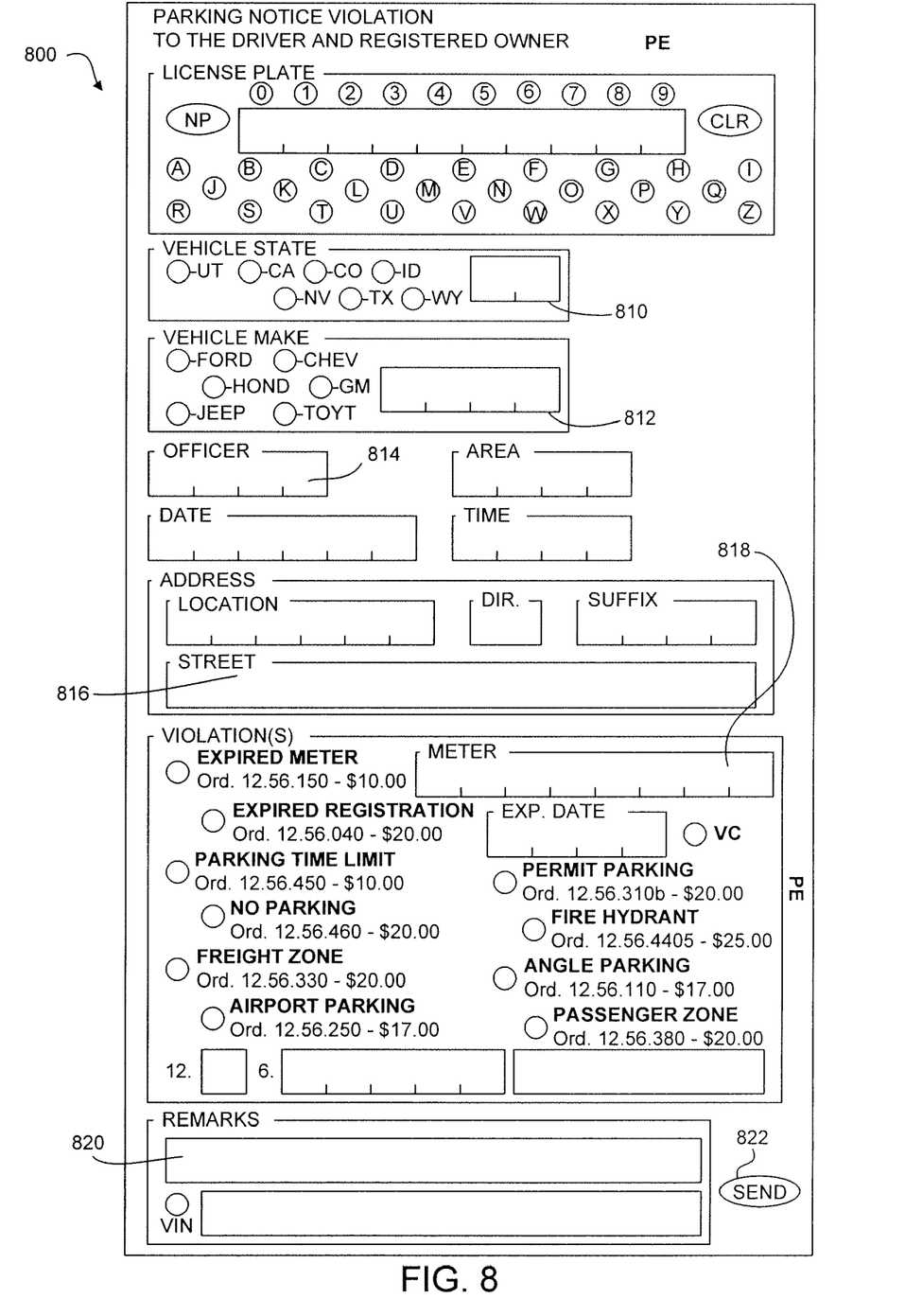
FIG. 8 graphically illustrates an example parking ticket with various fields where users may write characters (e.g., letters and/or numbers) for subsequent character recognition according to one embodiment.

By way of example, FIG. 8 graphically illustrates an example parking ticket 800 (Parking Notice Violation to the Driver and Registered Owner) with various fields 810, 812, 814, 816, 818, 820 where users may write characters (e.g., letters and/or numbers) for subsequent character recognition according to one embodiment. In one embodiment, the parking ticket 800 is a paper form including a position-coding pattern that is detectable by a digital pen, as discussed above. The parking ticket 800 may be filled out by a user such as a police officer or parking enforcement official using the digital pen.

When the user is finished writing information on the parking ticket 800, the user may write a pen stroke in or through a send field 822, which instructs the digital pen to send the data it has collected to the user's cellular phone or other communication device. The user who wrote the ticket 800 may then leave the paper copy of the parking ticket 800 on a vehicle's windshield. The data collected by the digital pen may be sent to and automatically processed by a central web server that may recognize the handwriting thereon, enter field selections in a searchable database, and/or render an electronic image of the parking ticket 800 with the user's pen strokes. The data may be used for violation enforcement and in automating a fine collection process.

In the example embodiment shown in FIG. 8, one or more of the fields 810, 812, 814, 816, 818, 820 may include lexical inference capabilities, as discussed herein. For example, a vehicle state field 810 may be associated with a list of two-letter state abbreviations that is compared with any strokes written in the field to thereby increase the probability of correctly recognizing the strokes. Other examples include a vehicle make field 812 that may be associated with a list of names and/or abbreviations of automobile manufacturers, an officer field 814 that may be associated with a list of known officer ID numbers, a street field 816 that may be associated with a list of local street names and abbreviations, a meter field 818 that may be associated with a list of unique meter ID numbers, and a remarks field 820 that may be associated with a list of frequently used words and abbreviations. Many other examples may occur to those of ordinary skill in the art upon reading this disclosure.

While specific embodiments and applications of the disclosure have been illustrated and described, it is to be understood that the disclosure is not limited to the precise configuration and components disclosed herein. Various modifications, changes, and variations apparent to those of skill in the art may be made in the arrangement, operation, and details of the methods and systems of the disclosure without departing from the spirit and scope of the disclosure.

What is claimed is:

1. A method for recognizing handwriting on a paper form using a digital pen, the method comprising:
   accessing a stroke collection file comprising data corresponding to a set of pen strokes marked by a user on the paper form using the digital pen;
   associating a field on the paper form with a predetermined lexical inference type;
   determining a subset of pen strokes in the stroke collection file corresponding to the field, wherein determining comprises:
     associating the field with an area on the paper form corresponding to a first set of coordinates;
     accessing a second set of coordinates corresponding to a particular stroke from the stroke collection file; and
     comparing the second set of coordinates to the first set of coordinates to determine whether the particular stroke was written within the area associated with the field;
   based on the lexical inference type, dynamically updating an inference lexicon associated with the field; and
   performing handwriting recognition on the subset of pen strokes based on the dynamically updated inference lexicon.

2. The method of claim 1, further comprising selecting the predetermined lexical inference type from a group comprising a word level, a word prefix level, a word suffix level, a word stem level, a punctuation model, and a grammar model.

3. The method of claim 1, further comprising associating the predetermined lexical inference type with a list of lexical inferences expected to be written in the field by the user.

4. The method of claim 1, wherein the lexical inference type comprises a word level, and wherein dynamically updating the inference lexicon associated with the field comprises:
   recognizing one or more of the pen strokes in the subset as a word in a predetermined word list; and
   based on a frequency of the recognized word, selectively adding the recognized word to the inference lexicon associated with the field.

5. The method of claim 1, wherein the lexical inference type comprises a word prefix level, and wherein dynamically updating the inference lexicon associated with the field comprises:
   recognizing one or more of the strokes in the subset as a word prefix in a predetermined prefix list; and
   based on the recognized word prefix, modifying valid lexical entries in the inference lexicon.

6. The method of claim 1, wherein the lexical inference type comprises a word stem level, and wherein dynamically updating the inference lexicon associated with the field comprises:

recognizing one or more of the strokes in the subset as a word stem in a predetermined stem list; and based on the recognized word stem, modifying valid lexical entries in the inference lexicon.

7. A system for recognizing handwriting, the system comprising:

a digital pen configured to write pen strokes on a paper form and to store corresponding stroke coordinates associated with respective pen stroke locations on the paper form; and a processor configured to;

associate a field on the paper form with a predetermined lexical inference type;

determine that the stroke coordinates correspond to the field by:

associating the field with an area on the paper form corresponding to a predetermined set of coordinates; and comparing the stroke coordinates to the predetermined coordinates to determine whether the pen strokes were written within the area associated with the field;

based on the lexical inference type, dynamically update an inference lexicon associated with the field; and perform handwriting recognition on the pen strokes based on the dynamically updated inference lexicon.

8. The system of claim 7, further comprising a wireless communication device configured to receive the stroke coordinates from the digital pen and to provide the stroke coordinates to the processor.

9. The system of claim 7, wherein the processor comprises a web-based server.

10. The system of claim 7, wherein the processor is further configured to select the predetermined lexical inference type from a group comprising a word level, a word prefix level, a word suffix level, a word stem level, a punctuation model, and a grammar model.

11. The system of claim 7, wherein the processor is further configured to associate the predetermined lexical inference type with a list of lexical inferences expected to be written in the field by the user.

12. The system of claim 7, wherein the lexical inference type comprises a word level, and wherein dynamically updating the inference lexicon associated with the field comprises:

recognizing one or more of the pen strokes as a word in a predetermined word list; and based on a frequency of the recognized word, selectively adding the recognized word to the inference lexicon associated with the field.

13. The system of claim 7, wherein the lexical inference type comprises a word prefix level, and wherein dynamically updating the inference lexicon associated with the field comprises:

recognizing one or more of the pen strokes as a word prefix in a predetermined prefix list; and based on the recognized word prefix, modifying valid lexical entries in the inference lexicon.

14. The system of claim 7, wherein the lexical inference type comprises a word stem level, and wherein dynamically updating the inference lexicon associated with the field comprises:

recognizing one or more of the pen strokes as a word stem in a predetermined stem list; and based on the recognized word stem, modifying valid lexical entries in the inference lexicon.

15. A computer readable medium storing computer executable instructions for performing a method for recognizing handwriting on a paper form using a digital pen, the method comprising:

accessing a stroke collection file comprising data corresponding to a set of pen strokes marked by a user on the paper form using the digital pen;

associating a field on the paper form with a predetermined lexical inference type;

determining a subset of pen strokes in the stroke collection file corresponding to the field, wherein determining comprises:

associating the field with an area on the paper form corresponding to a first set of coordinates;

accessing a second set of coordinates corresponding to a particular stroke from the stroke collection file; and comparing the second set of coordinates to the first set of coordinates to determine whether the particular stroke was written within the area associated with the field;

based on the lexical inference type, dynamically updating an inference lexicon associated with the field; and performing handwriting recognition on the subset of pen strokes based on the dynamically updated inference lexicon.

16. The computer readable medium of claim 15, wherein the method further comprises selecting the predetermined lexical inference type from a group comprising a word level, a word prefix level, a word suffix level, a word stem level, a punctuation model, and a grammar model.

17. The computer readable medium of claim 15, wherein the method further comprises associating the predetermined lexical inference type with a list of lexical inferences expected to be written in the field by the user.

18. The computer readable medium of claim 15, wherein the lexical inference type comprises a word level, and wherein dynamically updating the inference lexicon associated with the field comprises:

recognizing one or more of the pen strokes in the subset as a word in a predetermined word list; and based on a frequency of the recognized word, selectively adding the recognized word to the inference lexicon associated with the field.

19. The computer readable medium of claim 15, wherein the lexical inference type comprises a word prefix level, and wherein dynamically updating the inference lexicon associated with the field comprises:

recognizing one or more of the strokes in the subset as a word prefix in a predetermined prefix list; and based on the recognized word prefix, modifying valid lexical entries in the inference lexicon.

20. The computer readable medium of claim 15, wherein the lexical inference type comprises a word stem level, and wherein dynamically updating the inference lexicon associated with the field comprises:

recognizing one or more of the strokes in the subset as a word stem in a predetermined stem list; and based on the recognized word stem, modifying valid lexical entries in the inference lexicon.

* * * * *